United States Patent [19]

Nakano et al.

[11] Patent Number: 4,766,529

[45] Date of Patent: Aug. 23, 1988

[54] OPERATOR GUIDANCE BY COMPUTER VOICE SYNTHESIZER

[75] Inventors: Harumi Nakano, Oome; Yoshihito Shinmura, Kokubunji; Masaaki Fukumura, Iruma; Nobuaki Kuwabara, Hamura, all of Japan

[73] Assignee: Casio Computer Co., Ltd., Tokyo, Japan

[21] Appl. No.: 18,708

[22] Filed: Feb. 25, 1987

Related U.S. Application Data

[62] Division of Ser. No. 489,157, Apr. 27, 1983, Pat. No. 4,677,569.

[30] Foreign Application Priority Data

May 11, 1982 [JP] Japan ................................. 57-77467

[51] Int. Cl.[4] .............................................. G10L 5/00
[52] U.S. Cl. .................................. 364/513.5; 434/116
[58] Field of Search ...................... 381/43; 364/513.5; 434/116, 137

[56] References Cited

U.S. PATENT DOCUMENTS

| Re. 32,012 | 10/1985 | Pirz et al. | 364/513.5 |
|---|---|---|---|
| 3,918,030 | 11/1975 | Walker | 364/200 |
| 3,990,053 | 11/1976 | Evans | 364/900 |
| 4,107,460 | 8/1978 | Grunza et al. | 381/43 |
| 4,144,582 | 3/1979 | Hyatt | 364/900 |
| 4,185,169 | 1/1980 | Tanimoto et al. | 364/513.5 |
| 4,412,099 | 10/1983 | Niyada et al. | 364/513.5 |
| 4,459,673 | 7/1984 | Shibazaki et al. | 364/513.5 |
| 4,470,127 | 9/1984 | Thompson | 364/513.5 |
| 4,500,971 | 2/1985 | Futaki et al. | 364/513.5 |
| 4,516,207 | 5/1985 | Moriyama | 381/42 |

FOREIGN PATENT DOCUMENTS

| 2753707 | 12/1977 | Fed. Rep. of Germany . |
|---|---|---|
| 55-117199 | 9/1980 | Japan . |
| 56-797 | 1/1981 | Japan . |
| 57-134772 | 8/1982 | Japan . |
| 57-168335 | 10/1982 | Japan . |

OTHER PUBLICATIONS

IEEE Standard Dictionary, IEEE NY, NY, Third Edition, 1985, p. 356.
Nikkei Electronics, Jan. 18, 1982, pp. 126–147.
Electronics, Jun. 22, 1978, pp. 39–40.

Primary Examiner—Emanuel S. Kemeny
Attorney, Agent, or Firm—Frishauf, Holtz, Goodman & Woodward

[57] ABSTRACT

A computer controlled by a voice input has a speech recognition section for converting a keyword of a program which is entered by the voice input and corresponds to a start number, thereby obtaining a digital code. The digital code data which indicates the keyword selects the start number corresponding to the storage content of a table stored in a program memory. The start number data is used to access a start address of the corresponding program, thereby starting and executing the program. Also disclosed is a system wherein when a chosen key of a key input device is operated while a voice operator guidance is generated, a key-in signal is produced to forcibly stop the ongoing guidance. In particular, when a plurality of voice operator guidances are provided, the computer learns the state of the operation by the operator from the manner of the forcible stop, and automatically stops the generation of the voice guidance on a specific item from the next processing.

8 Claims, 10 Drawing Sheets

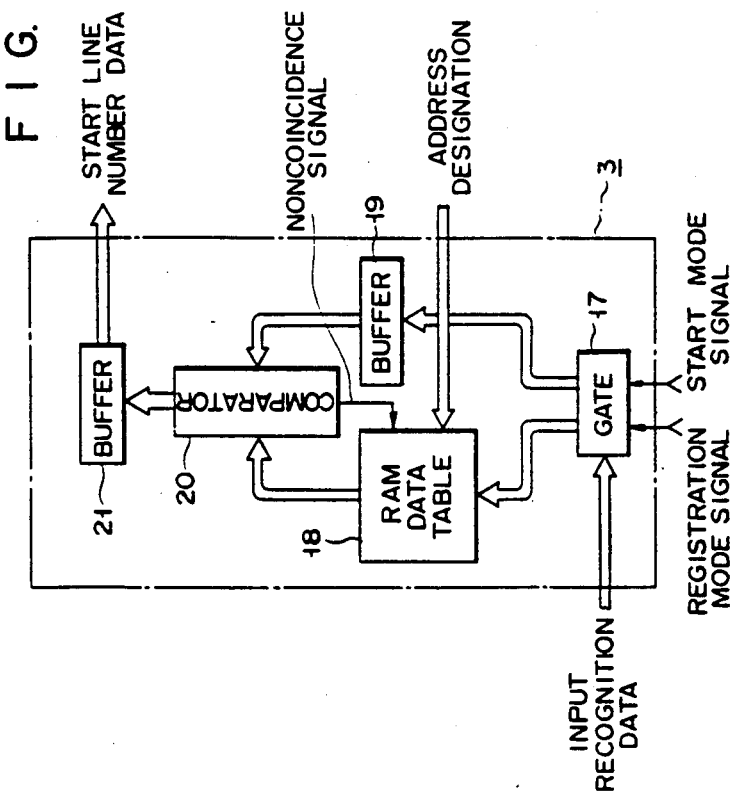

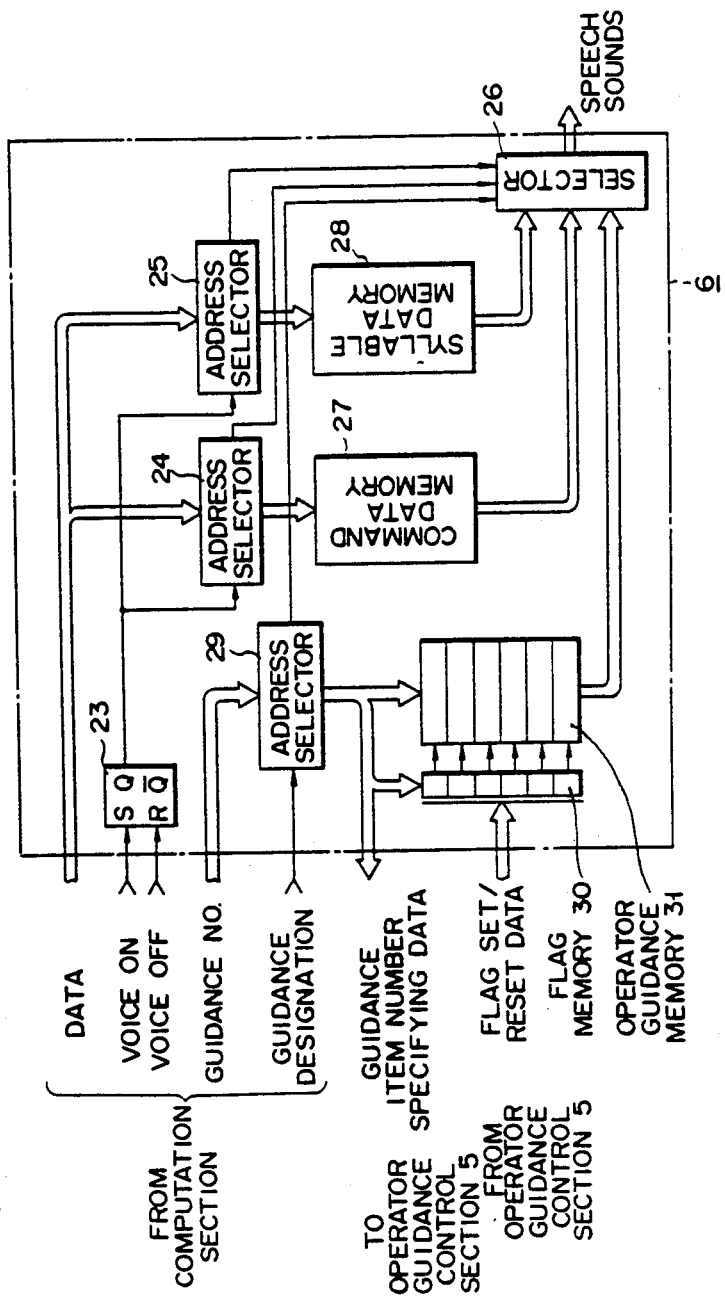
F I G. 5

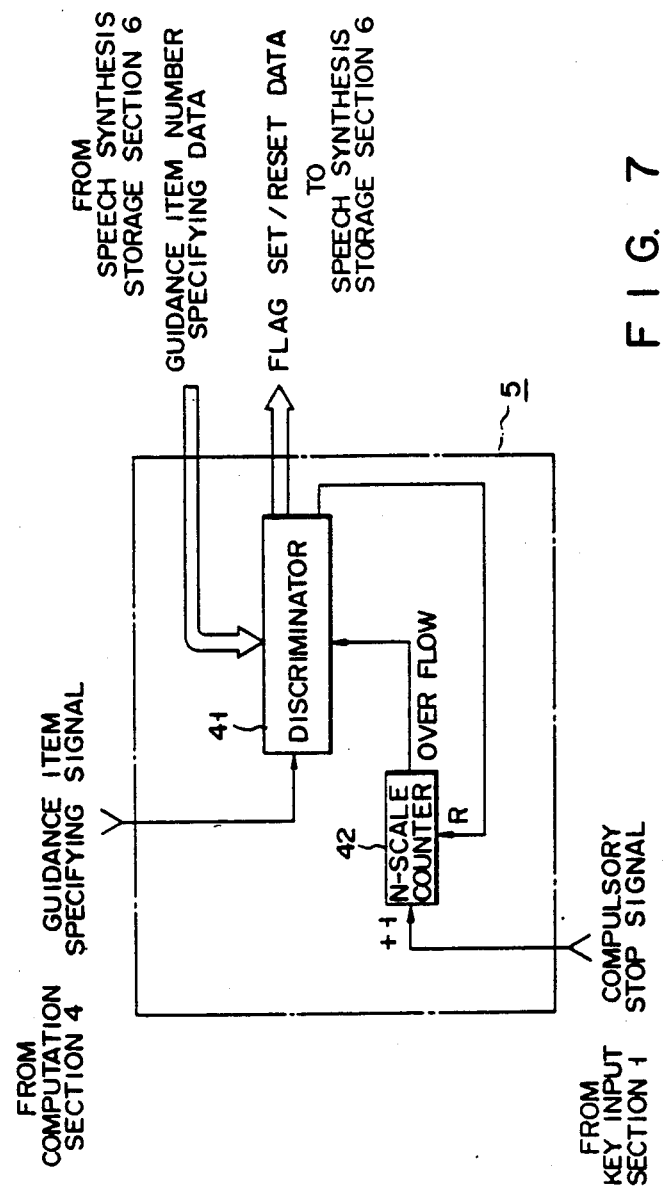

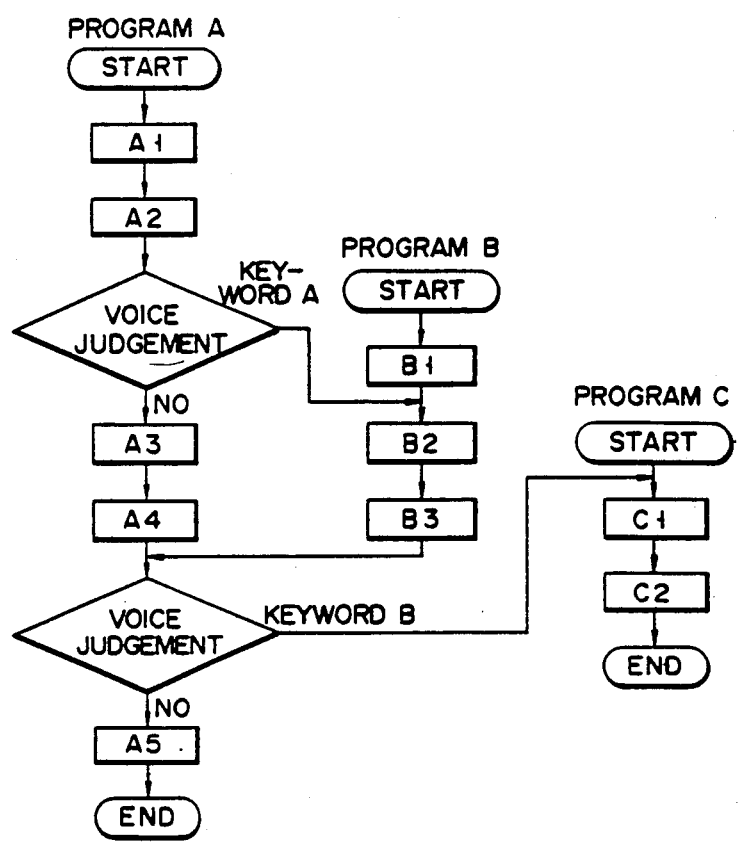

OPERATOR GUIDANCE BY COMPUTER VOICE SYNTHESIZER

CROSS-REFERENCE TO RELATED APPLICATION

This is a division of U.S. application Ser. No. 489,157, filed Apr. 27, 1983, now U.S. Pat. No. 4,677,569 issued June 30, 1987.

BACKGROUND OF THE INVENTION

The present invention relates to a computer which is controlled by a voice input to properly perform setting and selection of a program start word in accordance with a voice input, as well as confirmation of operator guidance data which is produced corresponding to the program executed based on the voice input.

In computers, a plurality of programs are generally stored in different areas of a memory. To execute a desired program, a program number or keyword which corresponds to the program name is entered, and a start address of this program is accessed, thereby starting the execution of the desired program.

When the number of programs stored in the memory is increased, the number of key words corresponding to the number of programs is also increased, resulting in cumbersome operation. No conventional apparatus has been proposed for entering the keyword of the program by a voice input so as to execute the corresponding program.

SUMMARY OF THE INVENTION

The present invention has been made in consideration of the above situation, and has for its object to provide a computer which is controlled by a voice input, wherein each keyword corresponding to a start address of a program among a plurality of programs stored in a memory can be specified by a voice input, thereby starting the execution of a selected program.

In order to achieve the above object of the present invention, there is provided a computer controlled by a voice input, comprising:

speech recognition means for recognizing a keyword entered as a voice input and for producing a digital code corresponding to the keyword;

program memory means for storing a plurality of programs in predetermined areas thereof and having start numbers respectively corresponding to the plurality of programs;

memory means connected to said speech recognition means and said program memory means, for storing the digital codes respectively corresponding to a plurality of keywords which in turn correspond to the start numbers;

comparing means connected to said memory means and said speech recognition means, for respectively comparing the digital codes corresponding to the keywords from said memory means with the digital codes corresponding to the keywords from said speech recognition means, and for generating an output signal so as to specify a given start number among the start numbers stored in said program memory, which corresponds to the keywords from said memory means and said speech recognition means upon detecting a coincidence thereof;

program starting means, connected to said comparing means, for receiving the output signal from said comparing means to start a given program among the plurality of programs which corresponds to the given start number; and program executing means for executing the given program started by said program starting means.

The computer having the above arrangement of the present invention provides the following advantages:

(i) A desired program can be executed if the operator memorizes only its program name or keyword without memorizing its start address or start line number.

(ii) A voice interrupt operation can be performed, so that first program can be terminated and another program can be begun. (iii) The operator can jump to a desired step by a voice input while he is observing the execution of the program.

(iv) Since a voice input can be used for stopping the program as well as starting it, the operator can stop the program by a voice input at an area remote from the computer if he feels the operation of the computer is abnormal.

BRIEF DESCRIPTION OF THE DRAWINGS

FIG. 3 is a block diagram of a speech recognition start control section 3 shown in FIG. 1;

FIG. 4 shows a data table of storage contents stored in a program memory 18 shown in FIG. 3;

FIG. 5 is a block diagram of a speech synthesis data storage section 6 shown in FIG. 1;

FIG. 7 is a block diagram of another example of an operator guidance control section; and FIGS. 8 to 13 are flow charts of different programs stored in the program memory 13 shown in FIG. 2.

DETAILED DESCRIPTION OF THE PREFERRED EMBODIMENT

Figure 1:
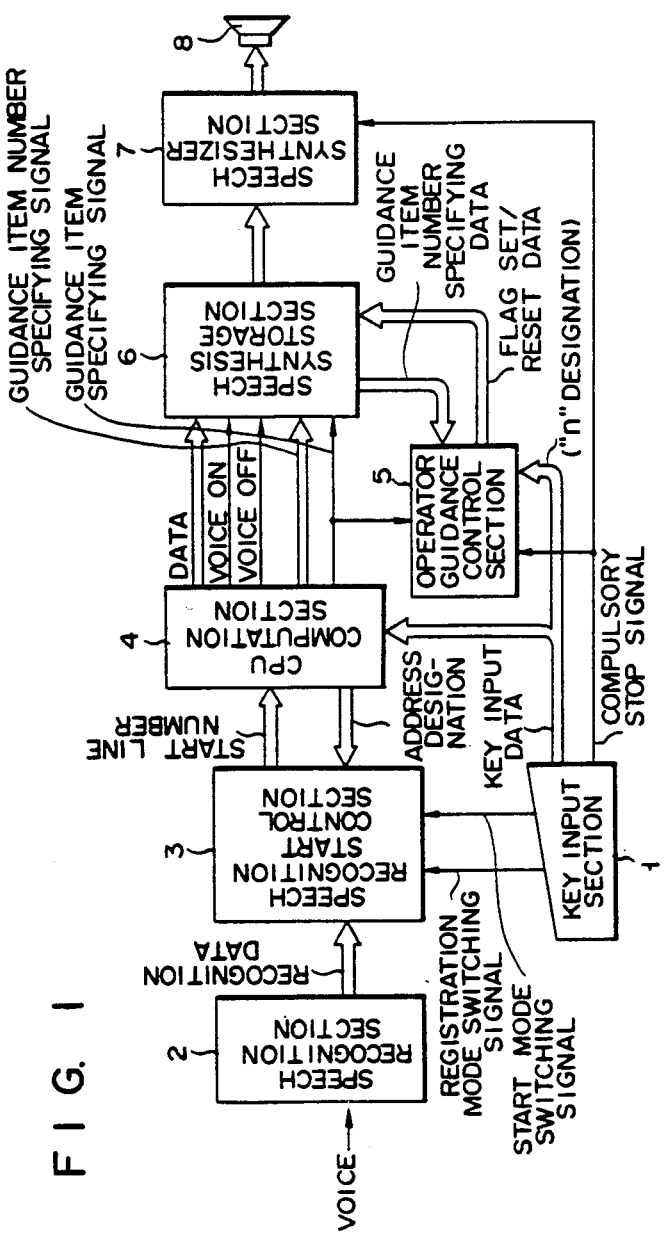
FIG. 1 is a block diagram of a computer system according to an embodiment of the present invention.

An embodiment will be described with reference to the accompanying drawings in which the present invention is applied to a personal computer. FIG. 1 is a block diagram showing the system configuration of the personal computer. A key input section 1 has keys for entering Japanese characters (katakana characters) and English letters, and various types of function keys. In order to start executing a program by a voice input to be described later, a mode key is arranged as one of the function keys in the key input section 1 to select either a registration mode or a start mode. The registration mode serves to preset or register a program keyword to be accessed later by the voice input. The start mode serves to start the desired program by the corresponding voice input. A mode selection signal for selecting either the registration mode or the start mode is supplied to a speech recognition start control section 3. Key input data input by each key is supplied to a computation section 4 and an operator guidance control section 5. When the operator depresses on of the keys in the key input section 1 while the operator guidance is being audibly produced during the execution of the predetermined program, the key input signal becomes a compulsory stop signal to stop the operator guidance from being produced, and is supplied to both the operator guidance control section 5 and a speech synthesizer section 7.

The speech recognition section 2 has a known arrangement described in Nikkei Electronics issued on Jan. 18, 1982. A voice input supplied from a microphone (not shown) is converted to digital recognition data which is then supplied to the speech recognition start control section 3. An address of the speech recognition start control section 3 is accessed by a signal from the computation section 4. In the registration mode, the keyword of the program is supplied as a voice input to the speech recognition section 2, and converted digital recognition data is stored in a corresponding data table. On the other hand, in the start mode, the keyword supplied as the voice input is used to retrieve the desired program among the programs stored in a memory. Data of a start line number of the retrieved program is supplied to the computation section 4, thereby starting the execution of the program.

The computation section 4 comprises a CPU (central processing unit) which controls the overall operation of the personal computer. The computation section 4 produces data of characters and statements (e.g., "GO TO" or "PRINT"), the latter being produced as speech sounds, signals "VOICE ON" and "VOICE OFF" which indicate production/interruption of the statements and characters as speech sounds, a guidance item number specifying signal for producting a specified operator guidance item as speech sounds, and a guidance item specifying signal. The guidance item specifying signal is also supplied to the operator guidance control section 5.

When one of six guidance item number specifying data (e.g., 1, 2, 3, ...), which causes the corresponding operator guidance item to be produced as speech sounds, is supplied from the speech synthesis data storage section 6 to the operator guidance control section 5, the operator guidance control section 5 produces flag set/reset data to set/reset a flag at a corresponding area of a flag memory 30 of the speech synthesis storage section 6.

When the speech synthesis data storage section 6 receives the data and signals decribed above, it produces voice (speech) data so as to produce an operator guidance item, a program statement, and a program list as the aggregate of the statements as speech sounds. This speech data is then supplied to the speech synthesizer section 7. The speech synthesizer section 7 has a known arrangement as is described in, e.g., "ELECTRONICS", June 22, 1978, pp. 39 and 40, McGraw-Hill Pubications Inc. Speech sounds are then produced from a loudspeaker 8. Meanwhile, if the compulsory stop signal is entered by the key at the key input section 1, the speech synthesis is interrupted.

A CRT display (not shown) is arranged at the computation section 4.

Figure 2:
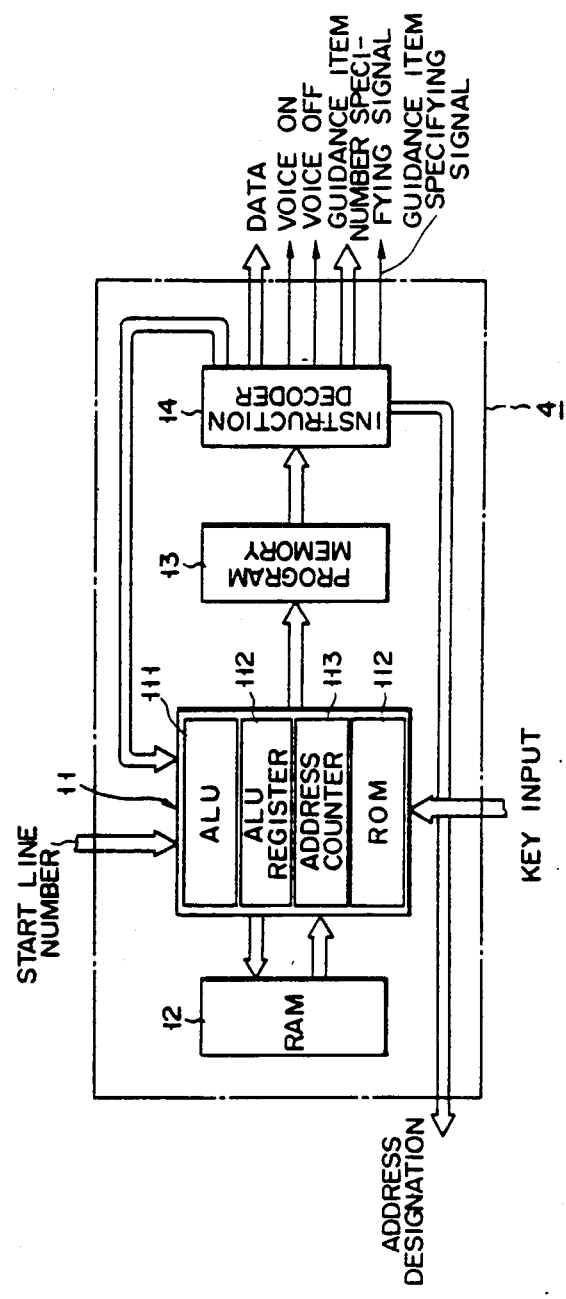
FIG. 2 is a block diagram of a computation section 4 shown in FIG. 1.

FIG. 2 is a detailed block diagram of the computation section 4. An arithmetic control section 11 comprises an arithmetic and logic circuit 111, an arithmetic register 112, an address counter 113, and a ROM (read-only memory) 114 for storing a control program. The arithmetic control section 11 performs address control and data read/write for a RAM (random access memory) 12 called a main memory, in accordance with the key input data. A plurality of written programs (e.g., in BASIC language) are preset in the program memory 13. The program read/write is performed with respect to the program memory 13 under the control of the arithmetic control section 11. When the start line number data from the speech recognition start control section 3 is supplied to the arithmetic control section 11, the corresponding program is read out from the program memory 13. The program data are sequentially supplied to an instruction decoder 14 wherein the statements received as speech sounds are decoded. The instruction decoder 14 produces the above-mentioned data, the signal "VOICE ON" or "VOICE OFF", the guidance item number specifying signal, and the guidance item specifying signal. The instruction decoder 14 also produces address data of the following program. The address data is then supplied to the arithmetic control section 11.

FIG. 3 is a detailed block diagram of the speech recognition start control section 3. A gate 17 receives the mode selection signal which indicates either the registration mode or the start mode as the selected mode, and the speech recognition data from the speech recognition section 2 which indicates the keyword of the program. When the gate 17 receives the registration mode selection signal, the input recognition data is supplied to a data table 18 and is stored in the data table. However, when the gate 17 receives the start mode selection signal, the input recognition data is supplied to a buffer 19. In the data table 18 in the registration mode, the program start line number data (e.g., 100, 200, 300, ...) supplied from the key input section 1 is written together with program data (e.g., "bumon" (department)) entered as speech sounds and converted to digital code data, as shown in FIG. 4.

FIG. 4 shows the data table wherein sequences of booking operations such as "department" and "item" (product name) are stored together with the program start line number data such as "100" and "200" so as to constitute paired data, respectively. On the other hand, in the start mode, the paired data are sequentially read out from the data table 18 and are supplied to one end of a comparator 20. Data from the buffer 19 is supplied to the other end of the comparator 20. These data are compared by the comparator 20. Until a coincidence between the data is established, the comparator 20 produces a noncoincidence signal which is then supplied to the data table 18, and the next paired data are then read out. When the comparator 20 produces a coincidence signal, it means that the desired program is detected, and the paired data thus identified are supplied to a buffer 21. The data from the buffer 21 are then supplied as the start line number data to the computation section 4. The address of the data table 18 is accessed by the address access signal from the computation section 4.

FIG. 5 is a detailed block diagram of the speech synthesis data storage section 6. The signals "VOICE ON" and "VOICE OFF" are respectively supplied to set and reset input ends S and R of an R-S flip-flop 23, but are not simultaneously supplied thereto. A set output signal Q from the R-S flip-flop 23 is supplied as a control signal to address selectors 24 and 25, and to a selector 26 through the address selector 25. The codes indicating the commands "GO TO" and "PRINT" used during the execution of the BASIC program are supplied from the computation section 4 to the address selector 24. Codes indicating Japanese words "tate (length)", "yoko (width)", "takasa (height)", and so on are supplied to the address selector 25. The code data supplied to the address selector 24 is produced as address access data which is then supplied to a speech command data memory 27. Speech command data (i.e., data such as the commands "GO TO" and "PRINT") is then read out from the speech command data memory 27 and is produced as speech sounds through the selector 26. The code data supplied to the address selector 25 is produced as address data for a syllable data memory 28. The syllable data memory 28 stores code data corresponding to Japanese syllables "a", "i", "u", . . . etc. When the address data is supplied to the syllable data memory 28, the addressed data is read out. The readout syllable data is produced as speech sounds through the selector 26. The syllable data memory 28 also stores numerical values as code data.

The guidance item specifying signal from the computation section 4 is supplied as the control signal to a selector 29 and to the selector 26 through the address selector 29. Six types of guidance item number data such as "200", . . . , and "560" are supplied to the selector 29. The data are then supplied from the selector 29 to a flag memory 30 of a 6-bit register and to an operator guidance memory 31. This data is also supplied as guidance item number specifying data (e.g., "1, 2, 3, . . . ") to the operator guidance control section 5. As described above, the flag memory 30 comprises a 6-bit register, each bit of which corresponds to one of the six operator guidance item number specifying data. The flag is set at a memory area corresponding to the operator guidance item specified by the guidance item number specifying data. The corresponding flag may also be set/reset in accordance with the flag set/reset data produced in response to the compulsory stop signal. Similarly, the operator guidance memory 31 stores operator guidance data in the area corresponding to those of the flag memory 30, respectively. The guidance item number specifying data and the corresponding flag data of the flag memory 30 can designate the address of the operator guidance memory 31. The operator guidance data read out from the operator guidance memory 31 is produced as speech data through the selector 26. When the flag is set in the flag memory 30, the operator guidance data at the corresponding address of the operator guidance memory 31 cannot be read out, thus prohibiting audible production of the operator guidance. However, when the flag is not set in the flag memory 30, the corresponding operator guidance data is read out as speech sounds from the operator guidance memory 31, thereby allowing audible production of the corresponding operator guidance. In the above embodiment, the flag memory 30 serves as a speech stop flag.

Figure 6:
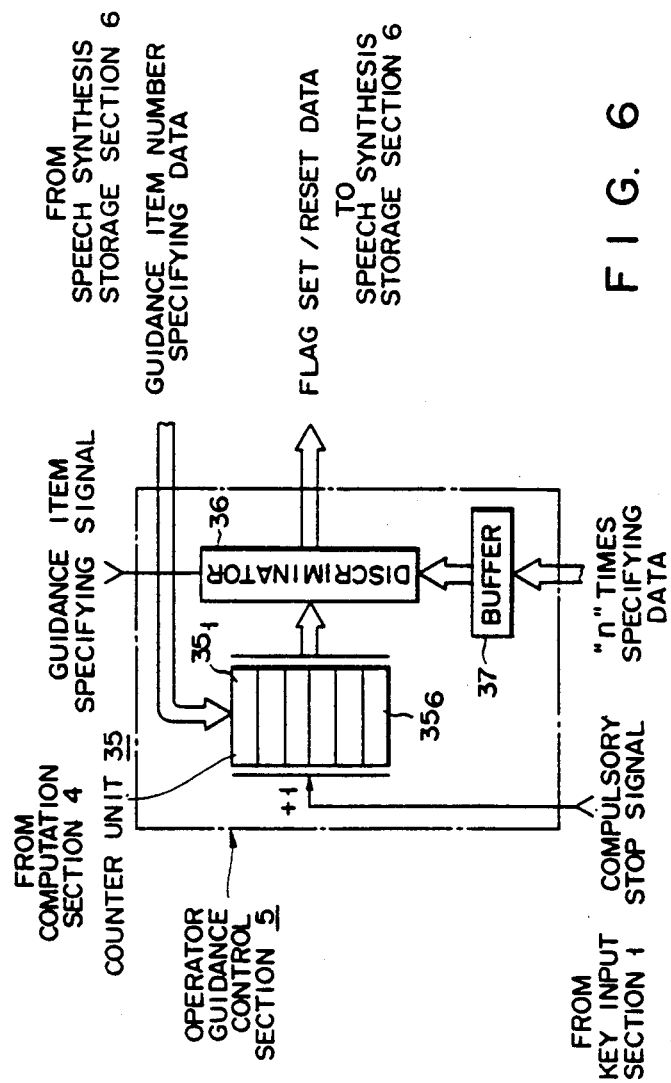
FIG. 6 is a block diagram of an operator guidance control section 5 shown in FIG. 1.

FIG. 6 is a detailed block diagram of the operator guidance control section 5. A counter unit 35, which includes six counters $35_1$ to $35_6$ respectively corresponding to the operator guidance data of six guidance items, is arranged in the operator guidance control section 5. The counters $35_1$ to $35_6$ are specified by the guidance item number specifying data, respectively. When the compulsory stop signal is supplied to the one of the counters $35_1$ to $35_6$ which is selected, the count of the corresponding counter is incremented by one. Each count is supplied to a discriminator 36. A number-of-times data (to be referred to as an "n" times specifying data) entered by the key input operation at the key input section 1 is supplied to a buffer 37. The "n" times specifying data is used to cause the discriminator 36 to determine whether or not a given operator guidance item is stopped in accordance with the number of times (e.g., n times) the compulsory stop signal is supplied with respect to the specified operator guidance item. When the "n" times specifying data is set to be 1 (i.e., n=1), the corresponding operation guidance item is not produced as speech sounds once the compulsory stop signal is supplied. The discriminator 36 produces flag set/reset data to set a signal of logic level "1" in the corresponding bit of the flag memory 30. If the operator guidance item specifying signal is produced by the computation section 4 so as to access the third operator guidance item data from the operator guidance memory 31, and if the "n" times specifying data is set in the buffer 37, this operator guidance is stopped when the compulsory stop signal has been entered at the key input section a total of n times.

The operation of the embodiment described above will be described hereinafter. In particular, an operation will be described which produces operator guidance as speech sounds in accordance with the corresponding voice input. Assume that a predetermined BASIC program is stored by the key input operation at the key input section 1 in the program memory 13 of the computation section 4. The six operator guidance item data are preset in the operator guidance memory 31 to be read out in accordance with the execution of the above-mentioned program. In order to stop the operator guidance after it has already been stopped three consecutive times, the operator enters at the key input section the "n" times data as n=3 in the buffer 37 of the operator guidance control section 5.

The program described above will be executed under the following conditions. At first, the counter unit 35 and the flag memory 30 have been cleared. In order to produce the first operator guidance item among the operator guidance data stored in the operator guidance memory 31, the computation section 4 produces the corresponding guidance item number specifying signal which is then supplied to the selector 29 of the speech synthesis data storage section 6. At the same time, the computation section 4 supplies the guidance item number specifying signal to the selector 29 and the selector 26 through the selector 29. The guidance item number specifying signal is also supplied to the discriminator 36 of the operator guidance control section 5 through the selector 29. The selectors 29 and 26 are simultaneously accessed, so that the first operator guidance item data is produced by the selector 29 which is then supplied to the operator guidance data memory 31, the flag memory 30 and the counter unit 35 of the speech synthesis data storage section 6. For this reason, the operator guidance data memory 31 is accessed for the first operator guidance item data. In this condition, the flag is not set at the corresponding bit position of the flag memory 30. The first operator guidance item data is read out and supplied from the selector 26 to the speech synthesizer section 7. The first operator guidance item is then audibly produced by the loudspeaker 8. When the operator hears this and depresses any key at the key input section 1, the compulsory stop signal is supplied to the operator guidance control section 5 and the speech synthesizer 7. In response to this operation, the speech synthesizer section 7 immediately stops sound production. Furthermore, the count of the counter $35_1$ corresponding to the first operator guidance item is incremented by 1 to be set as "1". The discriminator 36 then determines a non-coincidence of the count of "1" and the "n" times data "3" preset in the buffer 37. The discriminator 36 then performs no operation with respect to the flag memory 30. When the operator has depressed the key twice consecutively, the operator guidance is suppressed. In this condition, the count of the counter $35_1$ reaches "3", and the discriminator 36 determines the coincidence and sets the stop flag in the first bit of the flag memory 30.

After the flag is set in the first bit of the flag memory 30, the program continues. Even if a situation arises which supports production of the first operator guidance item, that is, even if the first guidance item specifying signal is entered into the operator guidance data memory 31 through the selector 29, the first operator guidance item data cannot be read out since the flag is set in the first bit of the flag memory 30, thereby disabling audible production of the first operator guidance item.

The operation of the speech output will be described using the speech output command "VOICE". The speech output command "VOICE" is a special command which is defined to produce a speech output in the personal computer. For example, the operator enters the following sentence:

VOICE "tate" (LENGTH)

The computation section 4 produces the signal "VOICE ON" to set the flip-flop 23 in the speech synthesis data storage section 6. The flip-flop 23 then produces the set output which starts the selectors 24, 25 and 26. The computation section 4 also produces data which indicate codes of Japanese syllables "ta" and "te", and supplies them to the selectors 24 and 25. The syllable data "ta" and "te" are read out from the syllable data memory 28 and are supplied to the speech synthesizer section 7 through the selector 26. As a result, the speech output "tate" (LENGTH) is then produced in accordance with the key input. Similarly, assume that the operator enters a sentence:

VOICE PRINT "takasa" (HEIGHT)

The speech output "takasa" (HEIGHT) is obtained in the same manner as described above, and the word "TAKASA" (HEIGHT) is displayed at a CRT display (not shown). When the operator enters a sentence,

VOICE ON the subsequent key-in program data is supplied to the selectors 24 and 25, so that the command of the statement is read out from the speech command data memory 27 and is supplied to the selector 26. The character data corresponding to the alphanumeric data of the statement is read out from the syllable data memory 28 and is supplied to the selector 26. In this manner, one statement including the syllable data corresponding to the key input is produced as speech sounds. Furthermore, the speech output is also displayed at the CRT display (not shown). However, when the operator enters a sentence:

VOICE OFF the computation section 4 produces the signal "VOICE OFF" so as to reset the flip-flop 23. Therefore, the selectors 24, 25 and 26 are opened, so that speech output is prohibited for each statement. Furthermore, when the operator enters a sentence:

VOICE LIST the program list prestored as the aggregate of the statements in the program memory 13 is supplied to the selectors 24 and 25. The program list is produced as speech sounds in the same manner as described above.

The program start operation initiated by a voice input will now be described. Assume that the user stores the programs of "bumon (department)", "hinmoku (items)", "suryo (quantity)" and "tanka (unit price)". of the booking operation, using the BASIC language. In this case, as shown in FIG. 4, the start lines of the "bumon" (department), "hinmoku" (items), "suryo" (quantity), and "tanka" (unit price) correspond to line numbers "100", "200", "300" and "400", respectively. The operation programs "owari (end)" or "stop" correspond to line numbers "500" and "560", respectively. The following program shows an example of the booking operation:

```
10  DIM A(10,100,2)
20  INPUT A
100 B=A
110 GOTO 20
200 C=A
210 GOTO 20
300 D=A
310 A(B,C,1)=A(B,C,1)+D
320 GOTO 20
400 A(B,C,2)=A(B,C,2)+D*A
410 GOTO 20
500 FOR I=1 TO 10
510 FOR H=1 TO 100
520 PRINT A(I,H,1)
530 PRINT A(I,H,2)
540 NEXT H
550 NEXT I
560 STOP
570 END
```

In order to register the keyword of the program name and the start line number as the paired data in the data table 18 of the speech recognition start control section 3, the mode selection signal is generated and is supplied to the gate 17 to set the registration mode by using the mode key at the key input section 1. The operator says the word "bumon (department)" as the start paired data in the microphone. The speech recognition section 2 then produces the digital recognition data corresponding to the word "bumon" (department). This digital recognition data is supplied by the gate 17 to the data table 18 and is stored therein. In this condition, the numerical data "100" is entered at the key input section 1 and is stored together with the digital recognition data as the paired data in the data table 18. The other five data shown in FIG. 4 are processed in the same manner as described above.

In order to start the booking operation, the operator must set the start mode at the key input section. The start mode selection signal is generated and supplied to the gate 17. Assume that the operator says the word "hinmoku" (item) at the microphone so as to execute the program "hinmoku (item)". The digital recognition data is supplied to the gate 17 and then to the buffer 19. The digital recognition data is supplied to one end of the comparator 20. Data "bumon (department)" of the first paired data is supplied from the data table 18 to the other end of the comparator 20. These data are then compared by the comparator 20. As the data do not coincide with each other, the comparator 20 produces a noncoincidence signal which is then stored in the data table 18. The storage of the noncoincidence signal allows access of the next address. Data "hinmoku" (item) of the second paired data is read out from the data table 18 and is supplied to the comparator 20. This data is subject to comparison in the comparator 20. In this case, since a noncoincidence signal is not produced by the comparator 20, the next address of the data table 18 is not accessed. The paired data "hinmoku (item) 200" is set in the buffer 21. The start line number data "200" is supplied from the buffer 21 to the arithmetic control section 11 of the computation section 4, thereby addressing as the start number the line number data "200"

stored in the program memory 13. Therefore, the program "hinmoku (item)" is started and executed.

Similarly, when the booking operation is completed and the operator says "owari (end)", the program corresponding to the start line number "500" is started. If the operator wishes to stop the program during its execution, he merely says "stop". In this case, the start line number "560" is selected, and the program is interrupted.

FIG. 7 is a block diagram of another operator guidance control section 5. Assume that the operator wishes to consecutively stop each operator guidance item (e.g., "bumon (department)", "hinmoku (item)", and "suryo (quantity)"). If the operator enters the compulsory stop signals for the first, seccnd and third operator guidance items, the subsequent operator guidance items (from the fourth item on) can be stopped since the operator guidance need not be used by the operator. Furthermore, when the first to third operator guidance items are consecutively stopped, all the operator guidance items (after the fourth operator guidance item and the first to third operator guidance items in the next sequence) are stopped.

Referring to FIG. 7, the line number specifying data, the guidance item number specifying signal, and an overflow signal from a scale of N counter 42 are supplied to a discriminator 41. The discriminator 41 determines whether or not the operator guidance is produced as speech sounds and produces flag set/reset data. The scale of N counter 42 receives the compulsory stop signal as a +1 signal and a reset signal from the discriminator 41.

The operation of the operator guidance control section 5 will now be described. If the operator suppresses the first to third operator guidance items and the first to third operator guidance items in the next cycle, the fourth to sixth operator guidance items are automatically stopped. In this case, at first, the scale of N counter 42 serves as a binary counter. The operator guidance item number specifying data of the first to third items (operator guidance) and the guidance item number specifying signal are supplied to the discriminator 41. Three compulsory stop signals which respectively correspond to the first to third guidance items are successively supplied to the counter 42. The count of the counter 42 is changed from "0" to "1" and "2". When the third stop signal is supplied to the counter 42, the counter 42 produces an overflow signal which is then supplied to the discriminator 41. The discriminator 41 sets the stop flags in the fourth to sixth bits of the flag memory 30 so as to correspond to the fourth to sixth operator guidance items in accordance with the data "3" which indicates the third operator guidance item. The operator guidance data is not produced. In this case, when the flag set output is supplied from the discriminator 41 to the counter 42, the counter 42 is reset. As a result, the fourth to sixth operator guidance items will not be produced.

Assume the user wishes to consecutively stop the first to third items and then stop the items (including the first to third items) after the fourth item in the next cycle. When the count of the counter 42 has overflowed, data up to the guidance item number specifying data "6" are supplied to the discriminator 41. The discriminator 41 then serves to set the flags in the first to sixth bits of the flag memory 30.

In the above embodiment, the present invention is applied to a personal computer, but it may be extended to any electronic equipment such as an office computer or any other computer, an ECR, or a facsimile, to which a speech synthesizer unit can be connected. The number and type of programs and of operator guidance items need not be limited to those in the above embodiment. Furthermore, the program language is not limited to the BASIC language, but may be extended to any computer language such as FORTRAN or an assembler.

A plurality of start line numbers are ser for a single program in the above embodiment. However, the start line numbers may be selected from a plurality of independent programs. Furthermore, the program start keyword may be replaced with a line number or the like.

The operation of the embodiment has been described above. A description will now be given with reference to the flowcharts of FIGS. 8 to 13 in which the data table 18 has different types and number of start addresses for executing commands in accordance with different programs of the data tables in the program memory 13 of the computation section 4 shown in FIG. 2.

Figure 8:
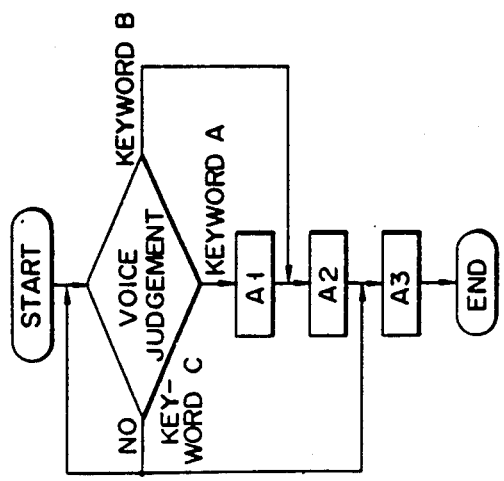

A program A shown in FIG. 8 has program blocks A1 to A3. A speech keyword A is entered to select the start address corresponding to the program memory, thereby executing the program block A1. When another speech keyword B is entered, the corresponding start address of the program memory is accessed, thereby executing the program block A2. Furthermore, when still another speech keyword C is entered, the corresponding start address of the program memory is accessed, thereby executing the program block A3. In this case, the above-mentioned program which has a plurality of program blocks is stored in the program memory 18 and has a plurality of start addresses each of which is accessed by the single speech keyword.

Figure 9:
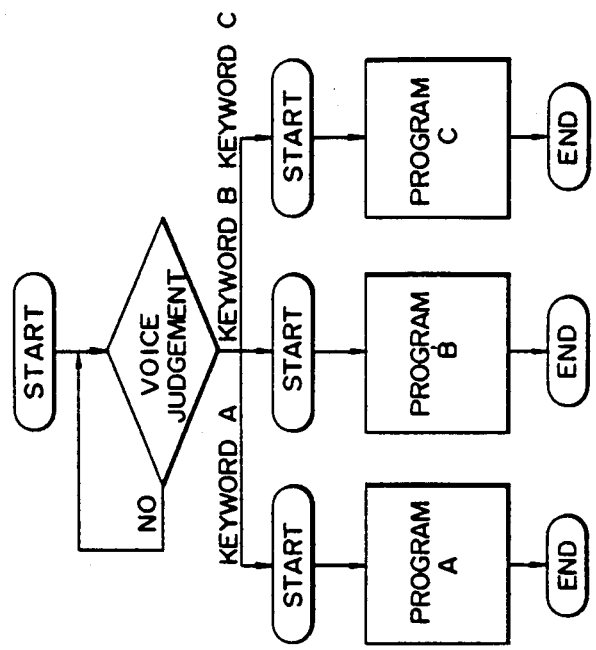

In the case shown in FIG. 9, a plurality of programs (i.e., programs A, B and C) are stored in the program memory 18 and are executed in accordance with the speech keywords A, B and C, respectively. The program memory 18 stores the plurality of programs and has a plurality of start addresses which are accessed by the plurality of keywords to execute the plurality of programs, respectively.

In the case shown in FIG. 10, the program memory 18 stores a plurality of programs which comprise: a program A of a plurality of program blocks A1 to A5; a program B of a plurality of program blocks B1 to B3; and a program C of program blocks C1 and C2. The program A has a judgement step for determining that the speech keyword A is entered and a judgement step for determining that the speech keyword B is entered. When the speech keyword A is entered, this entry is determined by the judgement step, and the routine jumps to a predetermined start address of the program B. Similarly, when the speech keyword B is entered, this entry is determined by the judgement step, and the routine jumps to a predetermined start address of the program C. In short, the program memory 18 has a plurality of programs and includes a jump command for executing at least one other program with the corresponding speech keyword.

Figure 11:
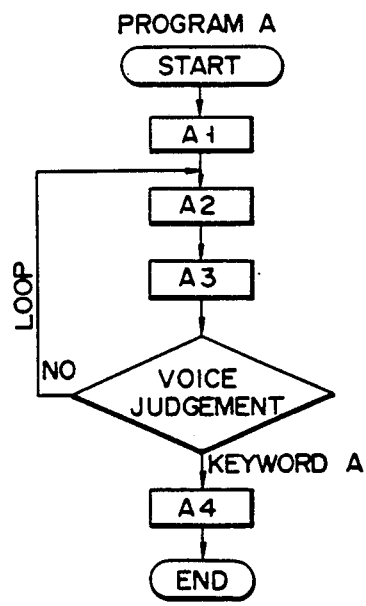

In the case shown in FIG. 11, the program memory 13 stores a program A which comprises program blocks A1 to A4 and which has a judgement step for determining that the speech keyword A is inserted between the program blocks A3 and A4. The program blocks A2, A3 and the judgement step constitute a loop. When it is determined that the speech keyword A is entered in the judgement step, the program flow loop is terminated and the program block A4 is started. In short, the program memory 13 stores a single program which comprises a plurality of program blocks. Some of the plurality of program blocks constitute a loop. One of the plurality of program blocks includes a start address for specifying termination of the loop by the entry of the speech keyword.

Figure 12:
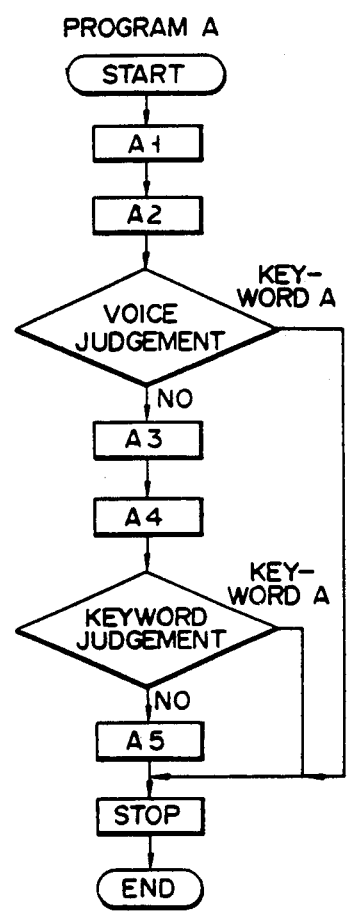

In the case shown in FIG. 12, the program memory 13 stores a single program A which comprises a plurality of program blocks A1 to A5 and which includes a judgement step for determining that the speech keywords A are respectively entered between the program blocks A2 and A3 and between the program blocks A4 and A5. When it is determined that the speech keyword A is entered in the judgement step, the program flow jumps to an interrupt step, so that the program is interrupted. Thus, the program memory 13 stores a single program which comprises a plurality of program blocks, and one of the plurality of program blocks includes a stop command for stopping the execution of the program upon entry of the speech keyword. The program memory 13 has a start address for receiving at least the stop command.

Figure 13:
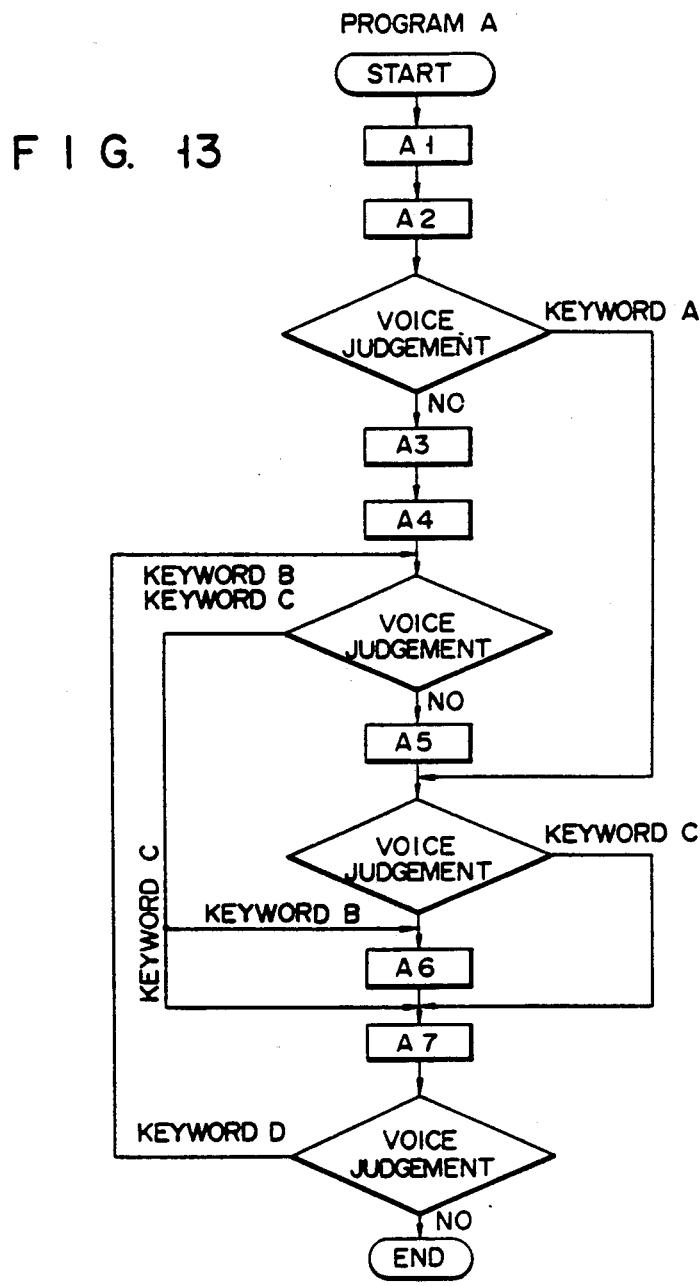

In the case shown in FIG. 13, the program memory 13 stores a single program which comprises a plurality of program blocks A1 to A7. The program includes a judgement step for determining the presence or absence of the speech keyword A between the program blocks A2 and A3, and a judgement step for determining the presence or absence of the speech keyword B between the program blocks A4 and A5. The program also includes a judgement step for determining the presence or absence of the speech keyword C between the program blocks A5 and A6, and a judgement step for determining the presence or absence of speech keyword D after the program block A7. When it is determined in the first judgement step that the speech keyword A has been entered, the program flow jumps to a flow after the program block A5. If it is determined in the second judgement step that the speech keyword B has been entered, the program flow jumps to a flow before the execution of the program block A6. If it is determined in the second judgement step that the speech keyword C has been entered, the program flow jumps to a flow after the program block A6. If it is determined in the third judgement step that the speech kevword C has been entered, the flow jumps to a flow after the program block A6. Furthermore, if it is determined in the fourth judgement step that the speech keyword D has been entered, the flow jumps to a flow after the program block A4.

As described above, the program memory 13 stores a single program which comprises a plurality of program blocks, and any one of the plurality of program blocks has a jump command for jumping to any other program block among the plurality of program blocks. The program memory 13 has a start address for receiving at least the jump command.

We claim:

1. An electronic apparatus with a voice control function, comprising:
guidance memory means for storing guidance data corresponding to a plurality of items, based on which a voice operator guidance is produced;
voice synthesis means for reading out said guidance data from said guidance memory means and for producing a voice signal corresponding to said read out guidance data;
voice guidance stop means for forcibly stopping an ongoing voice operator guidance, said voice operator guidance stop means being driven by a key-in signal of a given key provided on a key input device;
flag memory means for storing a flag for controlling the ON and OFF states of the voice operator guidance produced based on said guidance data stored in said guidance memory means, said flag memory means having flag areas corresponding to said guidance data corresponding to said plurality of items;
wherein when ongoing voice operator guidance corresponding to any one of said plurality of items is forcibly stopped by said voice guidance stop means, said flag setting means sets a stop flag in a flag area corresponding to said any one item, whereby voice operator guidance corresponding to said any one item is prohibited during a next processing corresponding to said any one item.

2. The electronic apparatus of claim 1, wherein, when the ongoing voice operator guidance corresponding to any one of said plurality of items is forced to be continuously stopped by said voice guidance stop means for n-times of processing, where n is an integer greater than one, said flag setting means sets a stop flag in a flag area corresponding to said any one item, whereby voice operator guidance corresponding to said any one item is prohibited from said next processing.

3. The electronic apparatus of claim 2, further comprising means for setting a value of n times of processing.

4. The electronic apparatus of claim 1, wherein, when said voice guidance stop means forcibly stops each voice operator guidance on sequential m-items, where m is an integer greater than one, said flag setting means sets stop flags in flag areas corresponding to the voice operator guidances of the following m-1 items, whereby the production of output voice signals on said following m-1 items is prohibited.

5. The electronic apparatus of claim 1, wherein when said voice guidance stop means forcibly stops each voice guidance on sequential m-items, where m is an integer greater than one, said flag setting means sets stop flags in flag areas corresponding to all items from the next processing, whereby the production of output voice signals on said all items is prohibited.

6. An electronic apparatus with a voice control function, comprising:
time-counting means for counting the time during which an operator guidance voice signal is produced in an electrical device;
stop means for forcibly stopping an ongoing operator guidance voice signal; and
control means coupled to said time-counting means for judging whether the time counted by said time-counting means from a point in time at which generation of said operator guidance voice signal is started to a point in time at which supply of said operator guidance voice signal is stopped by said stop means, falls within a predetermined period of time, and including means responsive to said counted time falling within said predetermined period of time for prohibiting the supply of the operator guidance voice signal from a next processing operation.

7. The electronic apparatus of claim 6, wherein said stop means is an operator selectable key provided on a key input device.

8. The electronic apparatus of claim 7, wherein there are provided a plurality of different operator voice guidances, and said time-counting means, stop means, and control means are provided for each different operator voice guidance.

* * * * *